(12) United States Patent
 Riibe

(10) Patent No.: US 9,296,269 B1
(45) Date of Patent: Mar. 29, 2016

(54) SAFETY LOCK FOR A TRAILER HITCH

(71) Applicant: Gary Riibe, Herman, NE (US)

(72) Inventor: Gary Riibe, Herman, NE (US)

( * ) Notice: Subject to any disclaimer, the term of this patent is extended or adjusted under 35 U.S.C. 154(b) by 0 days.

(21) Appl. No.: 14/537,077

(22) Filed: Nov. 10, 2014

Related U.S. Application Data

(63) Continuation-in-part of application No. 14/160,743, filed on Jan. 22, 2014, now Pat. No. 8,967,654, which is a continuation-in-part of application No. 14/042,805, filed on Oct. 1, 2013, now abandoned.

(51) Int. Cl.
 *B60D 1/28* (2006.01)
 *B60D 1/60* (2006.01)
 B60D 1/06 (2006.01)

(52) U.S. Cl.
 CPC .. *B60D 1/28* (2013.01); *B60D 1/60* (2013.01); B60D 1/06 (2013.01)

(58) Field of Classification Search
 CPC .............. B60D 1/28; B60D 1/58; B60D 1/60
 See application file for complete search history.

(56) References Cited

U.S. PATENT DOCUMENTS

| | | | |
|---|---|---|---|
| 1,805,642 A | 5/1931 | Strachan | |
| 1,926,264 A | 9/1933 | Connors | |
| 2,118,884 A | 5/1938 | Fuchs | |
| 2,564,520 A | 8/1951 | Blasdell | |
| 3,116,940 A | 1/1964 | Jinesa | |
| 3,181,887 A | 5/1965 | Boylan et al. | |
| 3,326,576 A * | 6/1967 | Kothmann | 280/515 |
| 3,328,741 A | 6/1967 | Brown | |
| 3,391,555 A * | 7/1968 | Mamo | 70/258 |
| 3,549,173 A * | 12/1970 | Stanfield | 280/457 |
| 3,724,875 A * | 4/1973 | Hillman | 280/457 |
| 3,770,298 A * | 11/1973 | Phillips | 280/457 |
| 3,782,759 A * | 1/1974 | Thune | 280/457 |
| 3,833,928 A | 9/1974 | Gavit et al. | |
| 4,774,823 A * | 10/1988 | Callison | 70/14 |
| 4,832,360 A | 5/1989 | Christian | |
| 5,434,552 A | 7/1995 | Ems | |
| 5,476,281 A * | 12/1995 | Worthington | 280/507 |
| 5,558,350 A | 9/1996 | Kimbrough et al. | |
| 5,584,495 A * | 12/1996 | Mason | 280/507 |
| 5,909,891 A | 6/1999 | Swart et al. | |
| 5,938,227 A | 8/1999 | Hills | |
| 5,947,504 A * | 9/1999 | Milazzo | 280/457 |
| 5,964,475 A | 10/1999 | Gentner et al. | |
| 6,102,424 A | 8/2000 | Cole et al. | |
| 6,199,891 B1 * | 3/2001 | Bell et al. | 280/507 |
| 6,222,443 B1 | 4/2001 | Beeson et al. | |
| 6,305,702 B1 | 10/2001 | Alford, II | |
| 6,382,657 B1 * | 5/2002 | Lynn et al. | 280/507 |
| 6,402,178 B1 | 6/2002 | Ifflaender | |
| 6,481,738 B1 | 11/2002 | Duncan et al. | |
| 6,840,339 B1 | 1/2005 | Nedele et al. | |
| 6,971,883 B1 | 12/2005 | Ridge | |
| 7,334,809 B2 * | 2/2008 | Coy | 280/507 |
| 7,404,591 B2 | 7/2008 | Bender | |
| 7,581,746 B2 | 9/2009 | Abate et al. | |
| 8,308,181 B2 | 11/2012 | Riibe | |
| 8,465,041 B2 | 6/2013 | Riibe | |
| 2002/0050698 A1 | 5/2002 | Dippenaar | |
| 2006/0186639 A1* | 8/2006 | Rosario | 280/507 |
| 2007/0176394 A1 | 8/2007 | Gehring et al. | |

* cited by examiner

*Primary Examiner* — Kevin Hurley
(74) *Attorney, Agent, or Firm* — Dennis L. Thomte; Thomte Patent Law Office LLC

(57) ABSTRACT

A safety lock for a trailer hitch is disclosed which not only eliminates the need for safety chains but also which prevents the theft of the trailer when the trailer has been disconnected from a vehicle.

1 Claim, 5 Drawing Sheets

SAFETY LOCK FOR A TRAILER HITCH

CROSS REFERENCE TO RELATED APPLICATION

This is a Continuation-In-Part of Application of Ser. No. 14/160,743 filed Jan. 22, 2014 entitled TRAILER HITCH, which is a Continuation-In-Part Application of application Ser. No. 14/042,805 filed Oct. 1, 2013, entitled TRAILER HITCH.

BACKGROUND OF THE INVENTION

1. Field of the Invention

This invention relates to a trailer hitch and more particularly to a trailer hitch which eliminates the need for safety chains. More particularly, this invention also relates to a safety lock which not only eliminates the need for safety chains but which also prevents the theft of the trailer when the trailer has been disconnected from a vehicle.

2. Description of the Related Art

Because of the danger of trailers becoming detached from the towing vehicle, some state governments require auxiliary safety attachments when a trailer is being pulled. A customary safety device usually involves a pair of safety chains which extend between the trailer tongue or coupling assembly to the hitch or frame of the towing vehicle. The connection of the safety chains may be awkward and difficult. Further, the safety chains sometimes become disconnected. Additionally, the safety chains drag on the roadway. The invention disclosed in the co-pending patent application Ser. No. 14/160,743 represents a vast improvement in the trailer hitch art. The instant invention represents a further improvement in the trailer hitch art. When the conventional trailer hitches of the hitch ball type are disconnected from a towing vehicle, a thief may connect the hitch ball coupler assembly of the trailer to his/her vehicle hitch and steal the trailer and whatever is on or in the trailer. Many types of anti-theft devices for use with a trailer have been provided. However, most of those anti-theft devices for trailers are separate from the trailer hitch and must be secured to the trailer coupler each time the trailer is detached from the towing vehicle. Further, it is believed that none of the prior art anti-theft devices for trailers also eliminates the need for safety chains.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer hitch is disclosed for connecting a trailer to the hitch drawbar of a towing vehicle such as a truck, pickup, tractor, etc. The hitch drawbar has a rearward end and an upper surface. A hitch ball is secured to the rearward end of the drawbar. The hitch ball includes a threaded shank which extends downwardly through an opening formed in the drawbar. A lock washer embraces the threaded shank of the hitch ball below the drawbar and a nut is threadably mounted on the threaded shank of the hitch ball to secure the hitch ball to the drawbar.

A hitch ball coupler assembly of the A-frame type is secured to the forwardly extending tongue of the trailer. The hitch ball coupler assembly includes a socket portion having an interior socket for receiving the ball of the hitch ball therein. A conventional locking device locks the socket portion to the hitch ball.

A safety lock and anti-theft device is selectively pivotally secured to the hitch ball coupler assembly. The safety lock and anti-theft device is selectively movable between a first locked position and a first unlocked position when the hitch ball coupler assembly is connected to the hitch ball. The safety lock and anti-theft device is also selectively movable between a second locked position and a second unlocked position when the hitch ball coupler assembly of the trailer is disconnected from the hitch ball. The safety lock and anti-theft device, when in the first locked position, has a portion thereof positioned closely below the lower end of the shank of the hitch ball to limit the upward movement of the socket portion of the hitch ball coupler assembly with respect to the hitch ball to prevent the disconnection of the hitch ball coupler assembly from the hitch ball. The safety lock and anti-theft device, when in the second locked position, and the hitch ball coupler assembly has been disconnected from the hitch ball, a portion thereof is positioned closely below the socket portion of the hitch ball coupler assembly to prevent a thief from connecting the socket portion of the hitch ball coupler assembly to a hitch ball of a towing vehicle. A locking pin selectively maintains the safety lock and anti-theft device in its first and second locked positions.

It is therefore a principal object of the invention to provide an improved safety lock for a trailer hitch.

A further object of the invention is to provide a safety lock for a trailer hitch which eliminates the need for safety chains.

A further object of the invention is to provide a safety lock for a trailer hitch including a safety locking assembly which prevents the separation of the trailer from the drawbar.

A further object of the invention is to provide a safety lock for a trailer hitch which prevents the separation of the trailer from the drawbar and which serves as an anti-theft device when the trailer is disconnected from the towing vehicle.

A further object of the invention is to provide a trailer hitch of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
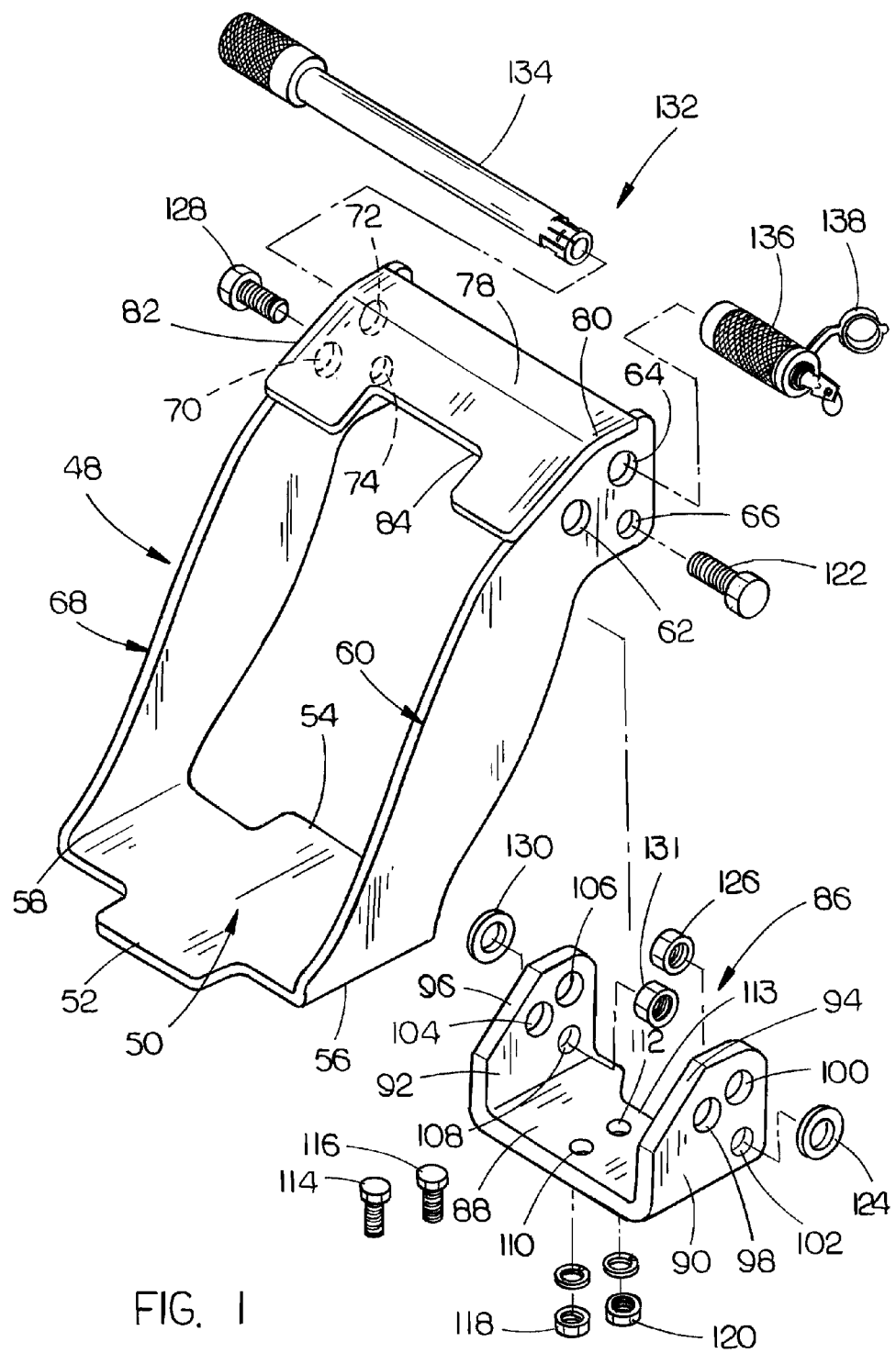
FIG. 1 is an exploded perspective view of the safety lock and anti-theft device of this invention.
Figure 2:
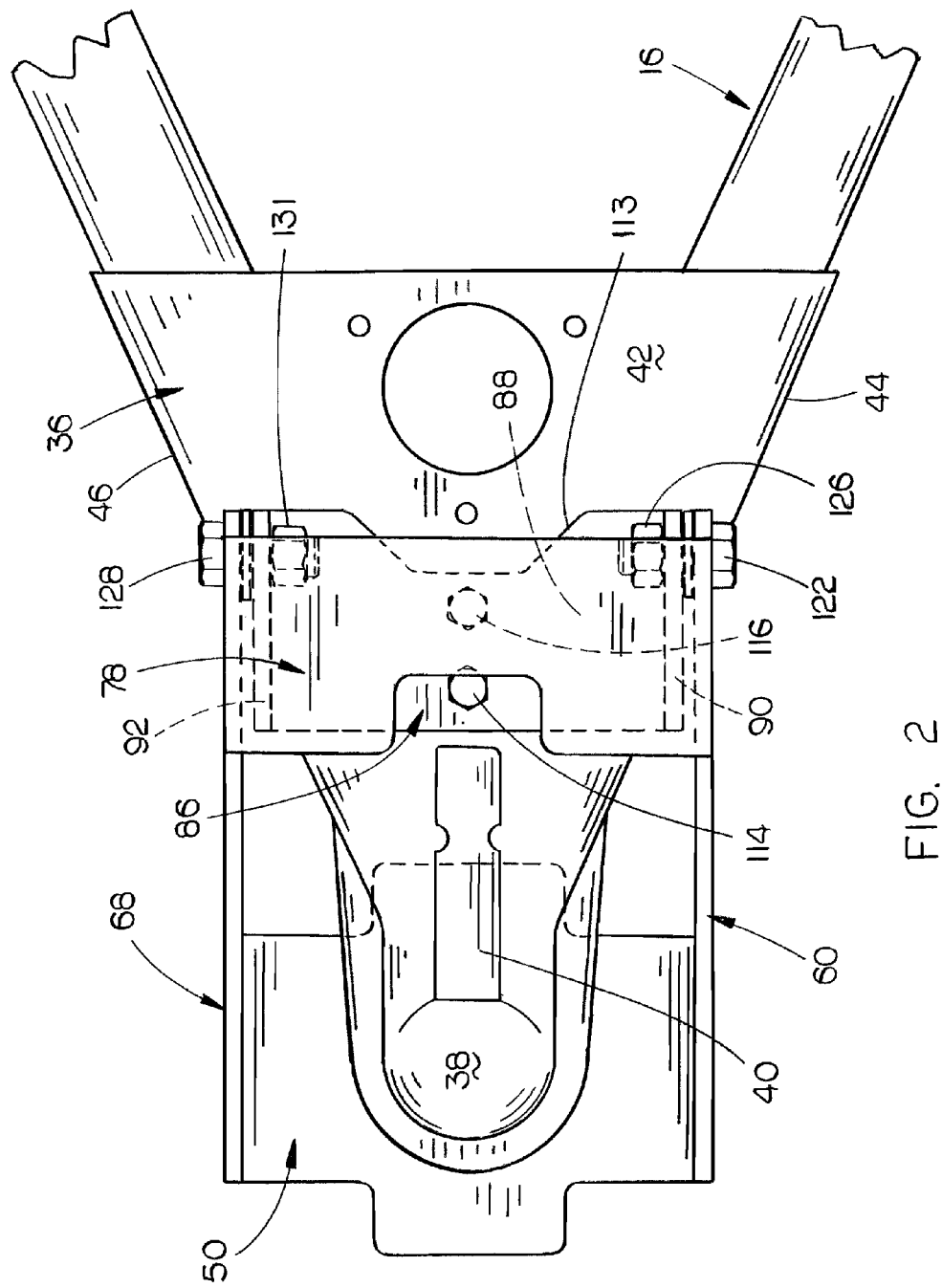
FIG. 2 is a top elevational view illustrating the safety lock and anti-theft device mounted on a hitch ball coupler assembly of the A-frame type.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional hitch drawbar which may be fixed to the frame of the rearward end of a towing vehicle or which may be secured to the rearward end of a tube 12 which is selectively received in a conventional receiver which is secured to the frame of the towing vehicle. For purposes of description, drawbar 10 will be described as having a rearward end 14, and an upper surface 16. Drawbar 10 has an opening 18 formed therein which is adapted to receive the externally threaded shank 20 of a hitch ball 22 including a ball portion 24, neck 26 and base portion plate 28. Threaded shank 20 is received in opening 18 and is retained therein by a lock washer 30 and nut 32 in conventional fashion. To this point, the drawbar 10 and hitch ball 22 are conventional in design.

The numeral 34 refers to a V-shaped tongue which extends forwardly from a trailer in conventional fashion. The numeral 36 refers to a hitch ball coupler assembly of the A-frame type which is secured to the forward end of tongue 34 and which extends forwardly therefrom. Coupler assembly 36 is conventional in design and includes a hitch ball socket 38 and a locking device 40. Coupler assembly 36 includes a top wall 42 and side walls 44 and 46. To this point the coupler assembly 36 is conventional in design.

The safety lock and anti-theft device of this invention is referred to by the reference numeral 48. Device 48 includes a lower plate 50 having a forward end portion 52, a rearward end portion 54, a first side 56 and a second side 58. Side plate 60 extends upwardly and rearwardly in a curved manner from side 56 of plate 50. The upper end of side plate 60 has openings 62, 64, and 66 formed therein. Side plate 68 extends upwardly and rearwardly from side 58 of plate 50 in a curved manner. The upper end of side plate 68 has openings 70, 72 and 74 formed therein. A curved plate 78 has its side edge 80 welded to side plate 60 at the upper end thereof. The side edge 82 of plate 78 is welded to side plate 68 at the upper end thereof. Plate 78 has a notch 84 formed therein.

The numeral 86 refers to a generally U-shaped or channel-shaped mounting bracket having a base 88 and upstanding legs 90 and 92. As seen in FIG. 1, the upper forward ends of legs 90 and 92 have angled portions 94 and 96 formed therein respectively. Leg 90 has openings 98, 100 and 102 formed therein. Leg 92 has openings 104, 106 and 108 formed therein. Base 88 of bracket 86 has openings 110 and 112 formed therein. The rearward end of base 88 has a notch 113 formed therein. Bracket 86 is secured to the top wall 42 of coupler assembly 36 by bolts 114 and 116 extending downwardly through openings 110 and 112 in base 88 and through registering openings formed in top wall 42. Nuts 118 and 120 are threadably secured to the lower ends of bolts 114 and 116 respectively.

Pivot bolt 122 extends inwardly through washer 124, through opening 66 in side plate 60 and through opening 102 in leg 90 of bracket 86. Nut 126 is threadably secured to the inner end of bolt 122. Pivot bolt 128 extends inwardly through washer 130, through opening 74 in side plate 68 and through opening 108 in leg 92 of bracket 86. Nut 131 is threadably secured to the inner end of bolt 128.

The numeral 132 refers to a conventional lock pin including a pin portion 134 and a key lock portion 136 which includes a cap 138 for closing the outer end thereof when the key of the key lock portion 136 is removed therefrom.

Prior to the coupler assembly 36 being connected to the hitch ball 22, the lock pin 132 will not be inserted into any of the openings 62, 64, 70 and 72. Thus, the side plates 60 and 68 are freely pivotal with respect to bracket 86 by way of the pivot bolts 122 and 128. The device 48 will then be pivoted to the broken line position of FIG. 3. The coupler assembly 36 may then be connected to the hitch ball 22. The locking device 40 of coupler assembly 36 will then be placed in its locked position in conventional fashion.

Figure 3:
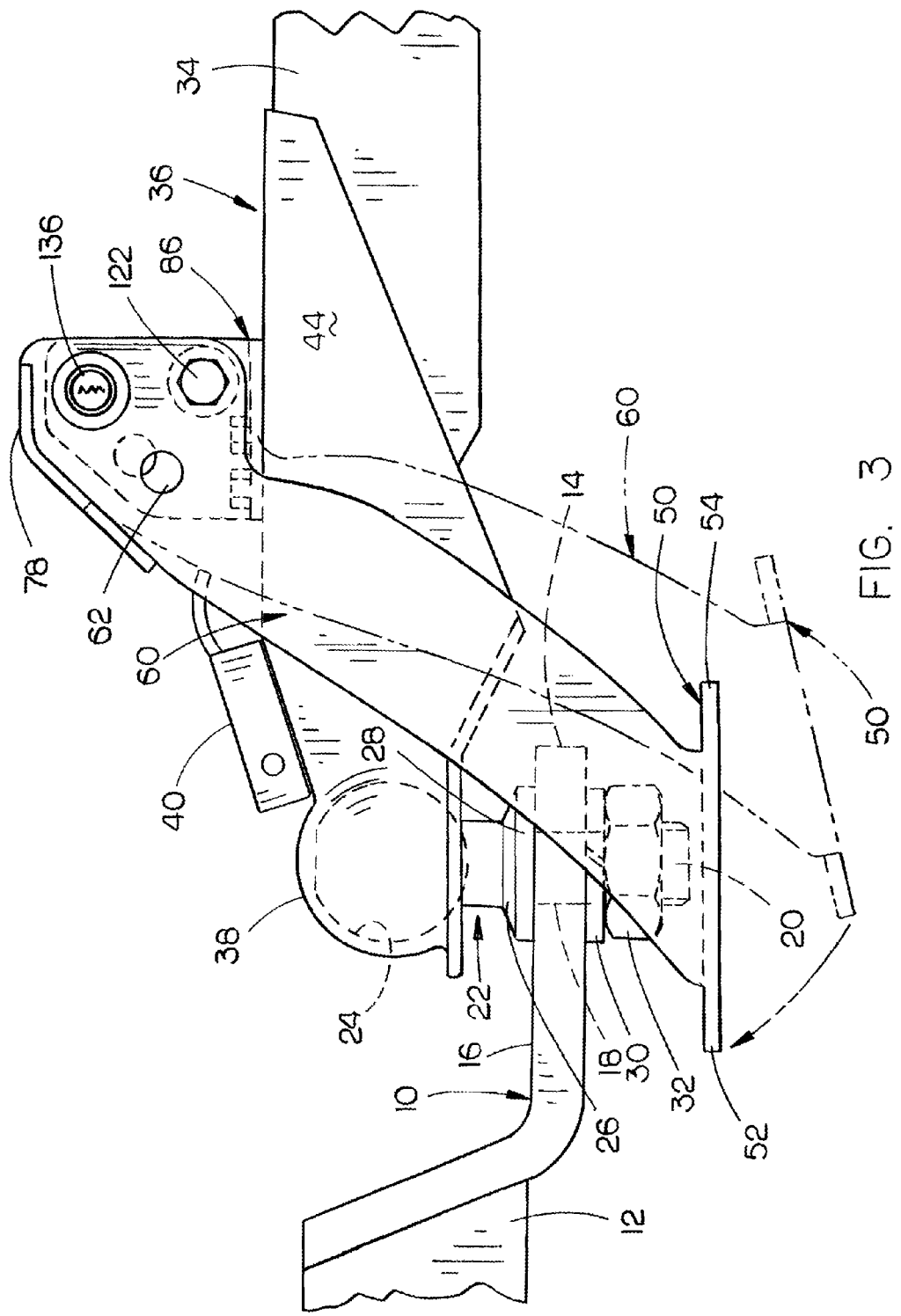
FIG. 3 is a side elevational view of the safety lock and anti-theft device of this invention in its first locked position and with certain of the broken lines illustrating the device in its first unlocked position.
Figure 4:
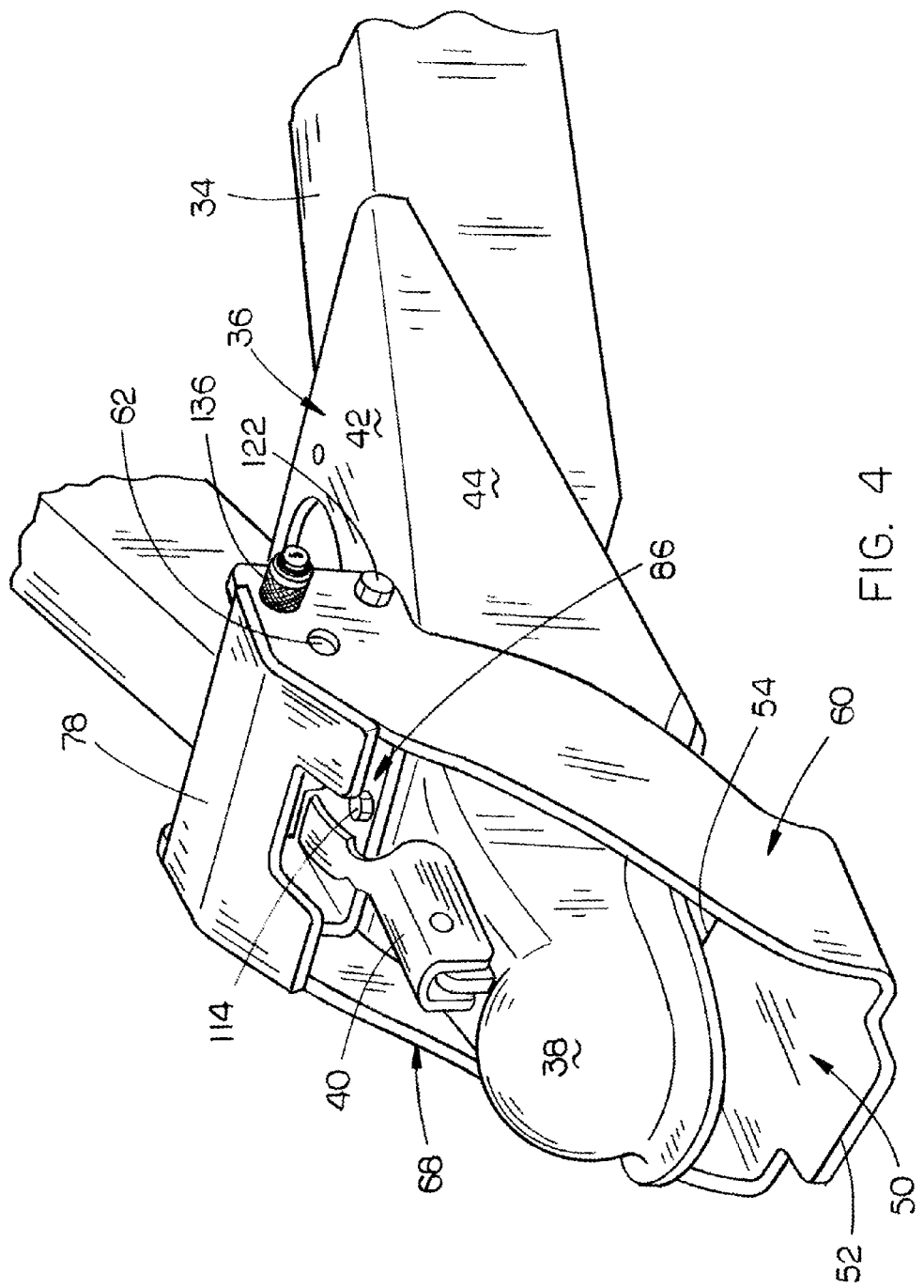
FIG. 4 is a front perspective view illustrating the device of this invention mounted on a hitch ball coupler assembly with the device being in its first locked position.

The device 48 is then pivoted to the solid line position of FIG. 3 so that plate 50 is closely positioned below the lower end of shank 20 of hitch ball 22. At that time, opening 64 in side plate 60 will register with opening 100 in leg 90 of bracket 86 and opening 72 in side plate 68 will register with opening 106 in leg 92 of bracket 86. Pin portion 134 of lock pin 132 is then extended inwardly through opening 72 of side plate 68 and through opening 106 of leg 92 of bracket 86 towards side plate 60. Key lock portion 136 of lock pin 132 is then extended inwardly through opening 64 of side plate 60 and through opening 100 of leg 90 of bracket 86. Key lock portion 136 is then locked onto the inner end of pin portion 134 in conventional fashion. The key of key lock portion 136 is then removed. Thus, device 48 is locked in a first locked position as seen in FIG. 3. The coupler assembly 36 cannot disconnect from hitch ball 22 when the device 48 is in the first locked position since plate 50 limits the upward movement of coupler assembly 36 with respect to hitch ball 22.

Figure 5:
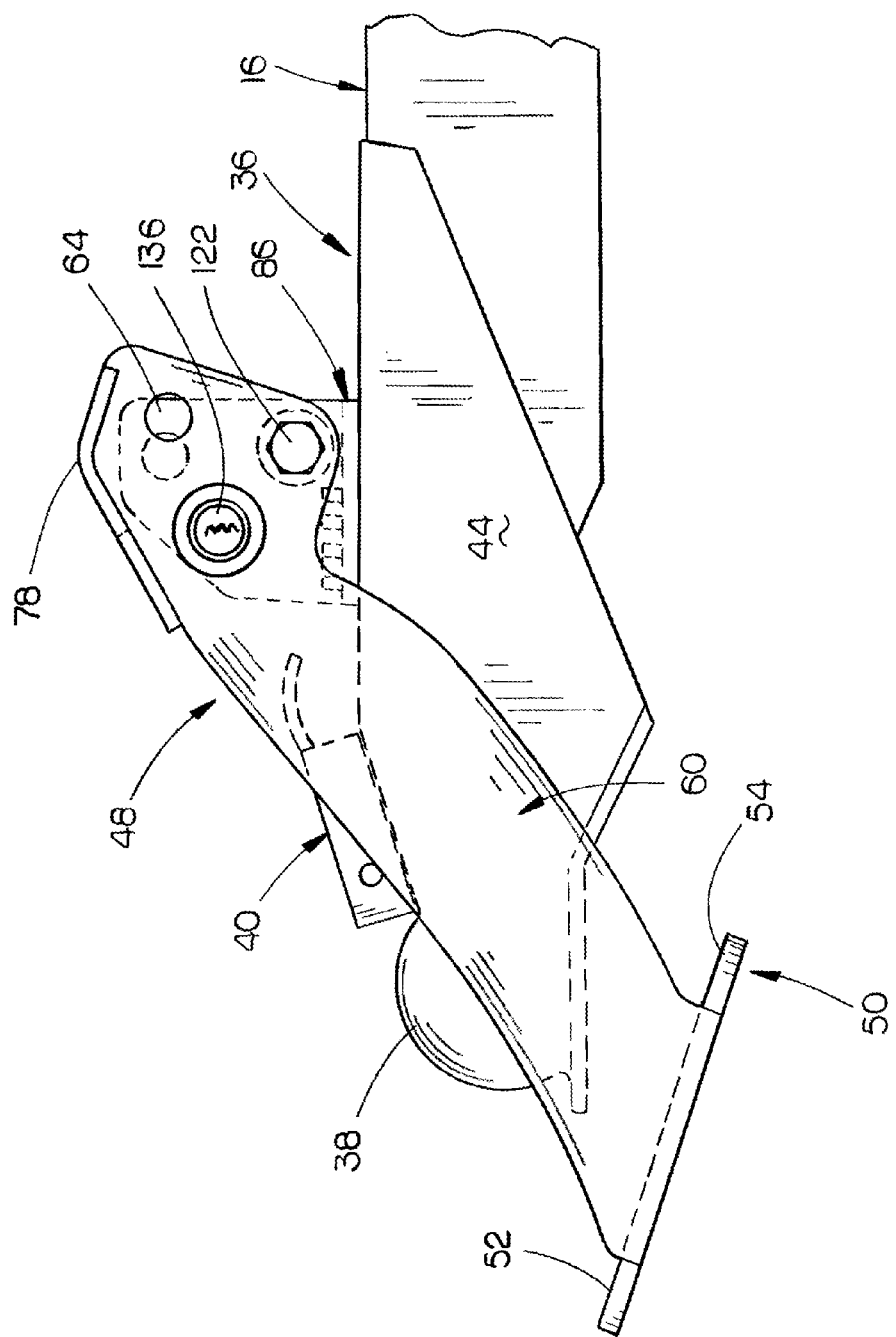
FIG. 5 is a side elevational view illustrating the device of this invention mounted on a hitch ball coupler device with the device being in its second locked position.

If the coupler assembly 36 is disconnected from the hitch ball 22 and it is desired to prevent the theft of the trailer, the device 48, with lock pin 132 initially removed from the device 48, is pivoted upwardly to the position of FIG. 5. In that position, opening 62 of side plate 60 will register with opening 98 of leg 90 of bracket 86 and opening 70 in side plate 68 will register with opening 104 of leg 92 of bracket 86. Pin portion 134 is then extended inwardly through openings 70 and 104 towards side plate 60. Key lock portion 136 is then extended inwardly through openings 62 and 98 and locked onto the inner end of pin portion 134 in conventional fashion.

In the second locking position of FIG. 5, which is an anti-theft position, the plate 50 will be closely positioned to socket portion 38 which will prevent a thief from connecting the coupler assembly 36 to the hitch of a potential towing vehicle.

Thus, it can be seen that a novel safety lock and anti-theft device has been provided which not only eliminates the need for safety chains but which provides an anti-theft device.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a towing vehicle having a rearwardly extending hitch drawbar, having a rearward end, and a hitch ball secured to the rearward end of the drawbar, with the hitch ball including a threaded shank, having a lower end, which extends downwardly through an opening formed in the drawbar, comprising:

a trailer including a forwardly extending tongue having a forward end;

a hitch ball coupler assembly secured to said forward end of said tongue which includes a socket portion having an interior socket for selectively receiving the hitch ball therein;

said hitch ball coupler assembly including a top wall and first and second sides;

a locking device movably associated with said socket portion to lock said socket portion to the hitch ball;

a safety lock and anti-theft device selectively pivotally secured to said hitch ball coupler assembly;

a generally U-shaped mounting bracket having a base portion and upstanding first and second legs;

said base portion of said mounting bracket being secured to said top wall of said hitch ball coupler assembly;

said first leg of said mounting bracket having first, second and third openings formed therein;

said second leg of said mounting bracket having first, second and third openings formed therein;

a locking assembly including a lower plate having a first side, a second side, a forward end and a rearward end;

said locking assembly including a first side plate having a lower end and an upper end;

said first side plate extending upwardly and rearwardly from said first side of said lower plate;

said first side plate having first, second and third openings formed therein at said upper end thereof;

said locking assembly including a second side plate having a lower end and an upper end;

said second side plate extending upwardly and rearwardly from said second side of said lower plate;

said second side plate having first, second and third openings formed therein at said upper end thereof which registers with said first, second and third openings in said first side plate;

an upper plate secured to said first and second side plates at said upper ends thereof and which extends therebetween;

said upper ends of said first and second side plates embracing said first and second legs of said mounting bracket;

said locking assembly including a first pivot bolt extending through said third opening of said first side plate and through said third opening in said first leg of said mounting bracket to pivotally secure said first side plate to said mounting brackets about a horizontal axis;

said locking assembly including a second pivot bolt extending through said third opening of said second side plate and through said third opening in said second leg of said mounting bracket to pivotally secure said second side plate to said mounting bracket about a horizontal axis;

said locking assembly being selectively movable between a first unlocked position and a first locked position relative to said mounting bracket;

said locking assembly also being selectively movable between a second unlocked position and a second locked position relative to said mounting bracket;

said second openings in said first and second side plates registering with said second openings in said first and second legs of said mounting bracket when said locking assembly is in said first locking position whereby a locking pin may be extended therethrough to selectively lock said locking assembly in said first locked position;

said first openings in said first and second side plates registering with said first openings in said first and second legs of said mounting bracket when said locking assembly is in said second locking position whereby a locking pin may be extended therethrough to selectively lock said locking assembly in said second locked position;

said locking assembly, when said hitch ball coupler assembly is connected to the hitch ball, being selectively movable to said first locked position whereby said lower plate of said locking assembly will be closely positioned below the upper end of the shank of the hitch ball to limit the upward movement of said socket portion of said hitch ball coupler assembly with respect to the hitch ball to prevent the disconnection of said hitch ball coupler assembly from the hitch ball;

said locking assembly, when said hitch ball coupler assembly is disconnected from the hitch ball, being selectively movable to said second locked position whereby said lower plate of said locking assembly will be closely positioned below said socket portion of said hitch ball coupler assembly to prevent a thief from connecting said socket portion of said hitch ball coupler assembly to a hitch ball of a towing vehicle.

* * * * *